(12) United States Patent
Miyajima

(10) Patent No.: US 9,285,739 B2
(45) Date of Patent: *Mar. 15, 2016

(54) PRINTING APPARATUS, CONTROL METHOD THEREOF, AND STORAGE MEDIUM

(71) Applicant: CANON KABUSHIKI KAISHA, Tokyo (JP)

(72) Inventor: Jun Miyajima, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/707,104

(22) Filed: May 8, 2015

(65) Prior Publication Data

US 2015/0241826 A1 Aug. 27, 2015

Related U.S. Application Data

(63) Continuation of application No. 13/669,618, filed on Nov. 6, 2012, now Pat. No. 9,050,842.

(30) Foreign Application Priority Data

Nov. 28, 2011 (JP) .................................. 2011-259511

(51) Int. Cl.
*G06K 15/02* (2006.01)
*G03G 15/23* (2006.01)
*B41L 39/16* (2006.01)

(52) U.S. Cl.
CPC .............. *G03G 15/231* (2013.01); *B41L 39/16* (2013.01); *H04N 2201/0082* (2013.01)

(58) Field of Classification Search
None
See application file for complete search history.

(56) References Cited

U.S. PATENT DOCUMENTS

| 5,528,734 | A | 6/1996 | Sanchez |
| 5,954,436 | A | 9/1999 | Kageyama et al. |
| 2001/0019671 | A1 | 9/2001 | Tokura |
| 2002/0131086 | A1 | 9/2002 | Mori et al. |

FOREIGN PATENT DOCUMENTS

| CN | 1361502 A | 7/2002 |
| CN | 1490719 A | 4/2004 |
| CN | 1794105 A | 6/2006 |
| CN | 1908888 A | 2/2007 |
| JP | H04149463 A | 5/1992 |
| JP | 2003-303087 A | 10/2003 |
| JP | 2007-203578 A | 8/2007 |

OTHER PUBLICATIONS

Chinese Office Action issued in corresponding application No. 201210497103.4 on Nov. 3, 2014.
Japanese Office Action issued in corresponding application No. 2011-259511 on Jun. 26, 2015.

*Primary Examiner* — Thomas D Lee
(74) *Attorney, Agent, or Firm* — Carter, DeLuca, Farrell & Schmidt, LLP

(57) ABSTRACT

A printing apparatus according to one aspect of this invention includes an assigning unit configured to assign the original images of a plurality of pages to the obverse surfaces and reverse surfaces of a plurality of sheets in the page order. The printing apparatus further includes a printing control unit configured to, when reverse order output of the original images of the plurality of pages is instructed, control to print the original images of the plurality of pages from a sheet to which the assigning unit assigns the original image of the final page out of the plurality of pages.

5 Claims, 12 Drawing Sheets

F I G. 1
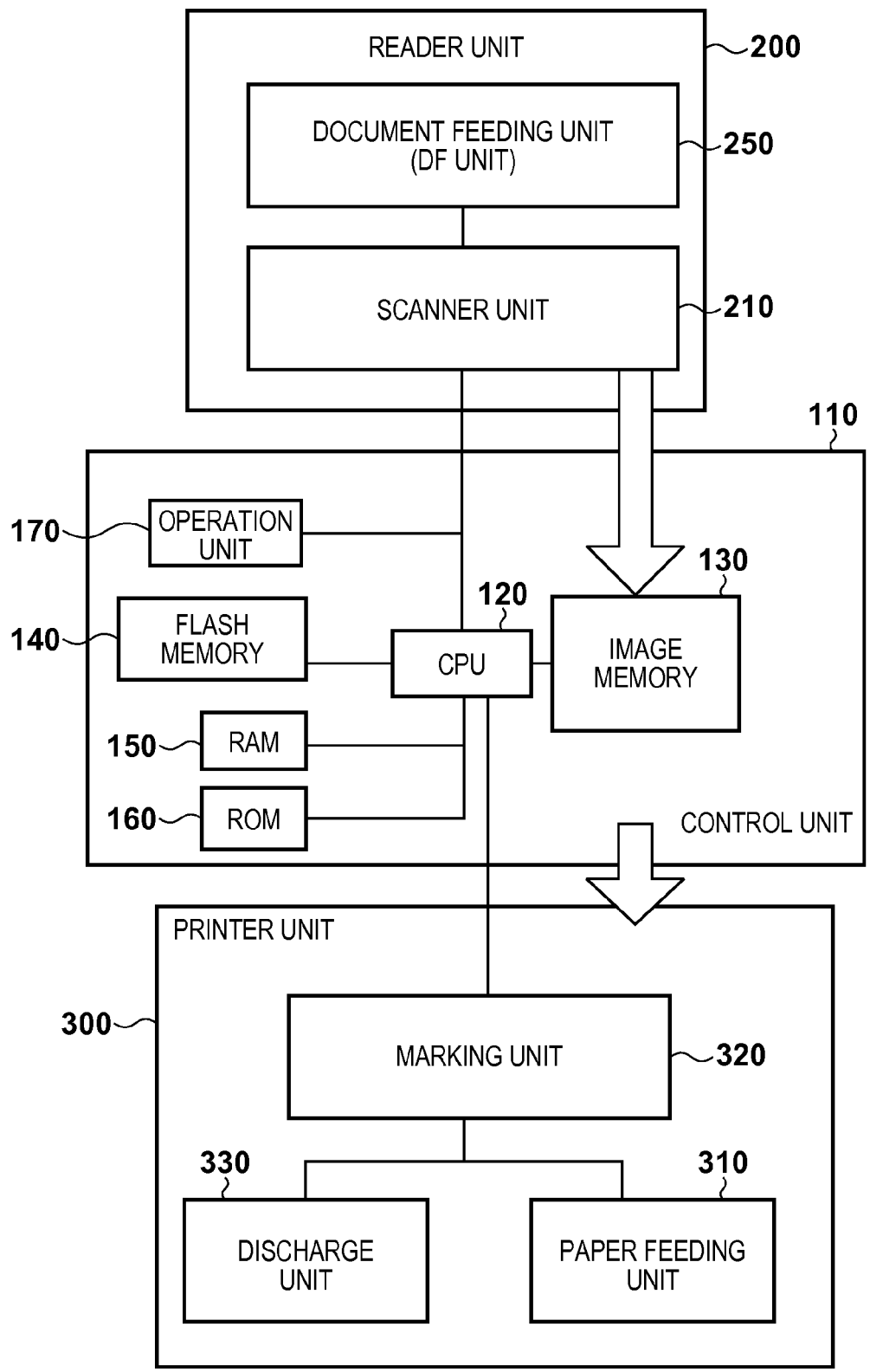

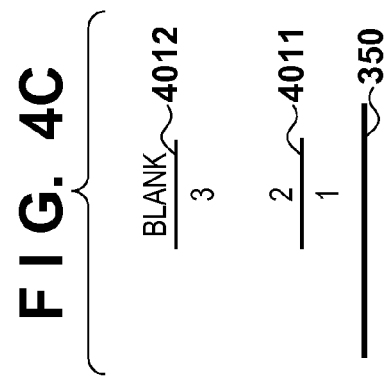
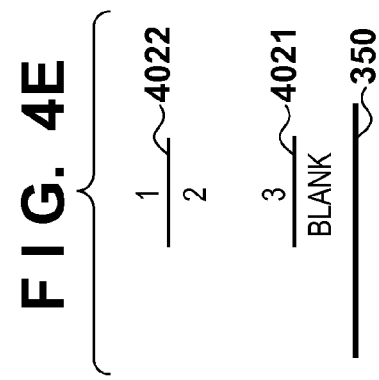
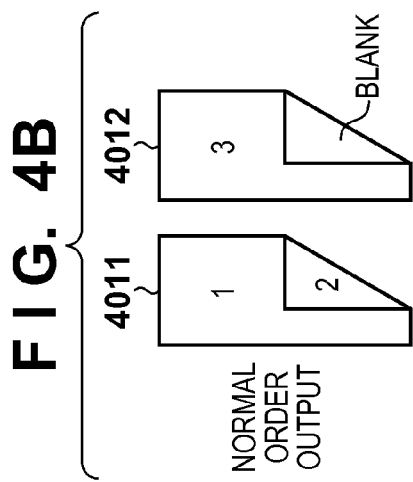
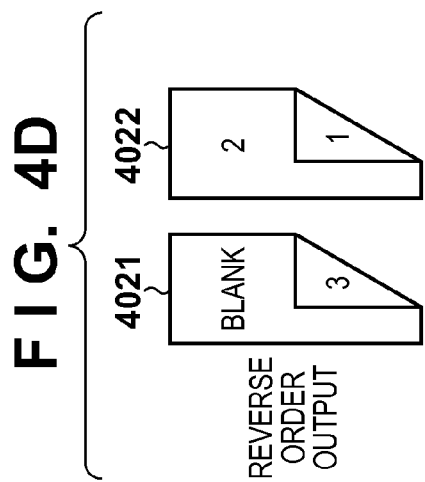
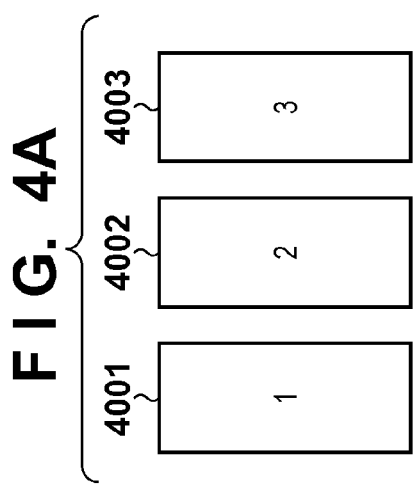

PRINTING APPARATUS, CONTROL METHOD THEREOF, AND STORAGE MEDIUM

CROSS REFERENCE TO RELATED APPLICATIONS

This application is a continuation of U.S. patent application Ser. No. 13/669,618 filed on Nov. 6, 2012, which claims the benefit of and priority to Japanese Patent Application No. 2011-259511, filed Nov. 28, 2011, each of which are hereby incorporated by reference herein in their entirety.

BACKGROUND OF THE INVENTION

1. Field of the Invention

The present invention relates to a printing apparatus, control method thereof, and storage medium.

2. Description of the Related Art

There has conventionally been known a digital copying machine having an electronic sorting function of temporarily storing, in a memory such as a hard disk, image data obtained by reading the image of an original, repetitively reading out image data of an arbitrary original from the memory, and copying and printing it. With this function, the digital copying machine can discharge copy sheets while sorting them, even without a sorter having a plurality of bins.

In PDL (Page Description Language) printing, a digital copying machine receives PDL data of an application in a host computer via a network. With the electronic sorting function, the digital copying machine rasterizes the received PDL data into a bitmap image, temporarily stores it in a memory such as a hard disk, repetitively reads out an arbitrary image from the memory, and prints it while sorting sheets.

A printing apparatus prepares face-down output for discharging output sheets with their printed surfaces facing down, and face-up output for discharging output sheets with their printed surfaces facing up. In face-down output, image data of an original are printed in the normal order. In face-up output, since image data of an original are printed in the reverse order, all image data of the original are temporarily stored in a memory and then printed in the reverse order.

Depending on the page count of an original such as Nin1 reduction layout, a final sheet in normal order output may have a special layout. For example, when printing seven pages of an original in a 4in1 reduction layout, "1, 2, 3, 4" pages are printed on the first sheet, and "5, 6, 7" pages are printed on the second sheet. If these pages are printed simply in the reverse order, "4, 5, 6, 7" pages are printed first and then "1, 2, 3" pages are printed, and the layout result differs from that in normal order output. To prevent this, Japanese Patent Laid-Open No. 2007-203578 proposes a method of, in reverse order output, calculating the layout of the first sheet in reverse order output in accordance with the page count of an original and the reduction layout setting.

In double-sided printing, when the page count of an original is an odd number, the reverse of the final sheet becomes blank. For example, double-sided printing of three pages of an original results in "obverse 1, reverse 2" and "obverse 3, reverse blank". Printing this original in reverse order results in "obverse 3, reverse 2" and "obverse 1, reverse blank". Even in this case, imposition in normal order output and the printing result by reverse order output differ from each other. Hence, similar to the reduction layout, imposition on the first sheet in reverse order output is calculated from the page count of an original and the double-sided printing setting. When the page count of an original is an odd number, the obverse surface of the first sheet in reverse order output is set to be blank, and when it is an even number, the obverse surface of the first sheet in reverse order output is printed. That is, a conventional printing apparatus performs imposition and layout for the first sheet in reverse order output by calculation in accordance with the page count of an accumulated original and the set values of a job.

In double-sided printing of originals of different sizes, imposition cannot be performed on the obverse and reverse of a single output sheet. More specifically, if an A4-size original and A3-size original are imposed on the two surfaces of one A4-size sheet, the image of the A3-size original extends outside the sheet and cannot be normally printed. To prevent this, when performing double-sided printing of, for example, A4- and A3-size originals, the A4-size original is printed on the obverse of an A4-size sheet while leaving its reverse surface blank. Also, the A3-size original is printed on the obverse of an A3-size sheet while leaving its reverse surface blank. In this fashion, to perform double-sided printing of originals of different sizes, when the original size changes, the paper size is changed. If there is no original corresponding to the reverse surface, the reverse surface remains blank. In this case, if imposition and layout for the first sheet are executed by calculation based on the page count of an accumulated original and the set values of a job according to the method disclosed in Japanese Patent Laid-Open No. 2007-203578, an output result in reverse order output differs from one in normal order output.

SUMMARY OF THE INVENTION

The present invention has been made to solve the conventional drawbacks, and provides a technique capable of easily outputting the same printing result as that in normal order output even when double-sided printing of original sheets of different sizes is performed in reverse order output.

According to one aspect of the present invention, there is provided a printing apparatus comprising: an assigning unit configured to assign original images of a plurality of pages to obverse surfaces and reverse surfaces of a plurality of sheets in a page order; and a printing control unit configured to, when reverse order output of the original images of the plurality of pages is instructed, control to print the original images of the plurality of pages from a sheet to which the assigning unit assigns an original image of a final page out of the plurality of pages.

According to another aspect of the present invention, there is provided a printing apparatus control method comprising: assigning original images of a plurality of pages to obverse surfaces and reverse surfaces of a plurality of sheets in a page order; and when reverse order output of the original images of the plurality of pages is instructed, controlling to print the original images of the plurality of pages from a sheet to which an original image of a final page out of the plurality of pages is assigned in the assigning.

According to the present invention, even when double-sided printing of original sheets of different sizes is performed in reverse order output, the same printing result as that in normal order output can be easily output.

Further features of the present invention will become apparent from the following description of exemplary embodiments (with reference to the attached drawings).

BRIEF DESCRIPTION OF THE DRAWINGS

FIG. 1 is a block diagram showing the overall arrangement of an image input/output system to which an image forming apparatus (printing apparatus) according to the first embodiment is applicable;

FIGS. 4A to 4E are views for explaining normal order and reverse order output operations in double-sided printing of original sheets of the same size in the first embodiment;

DESCRIPTION OF THE EMBODIMENTS

Figure 2:
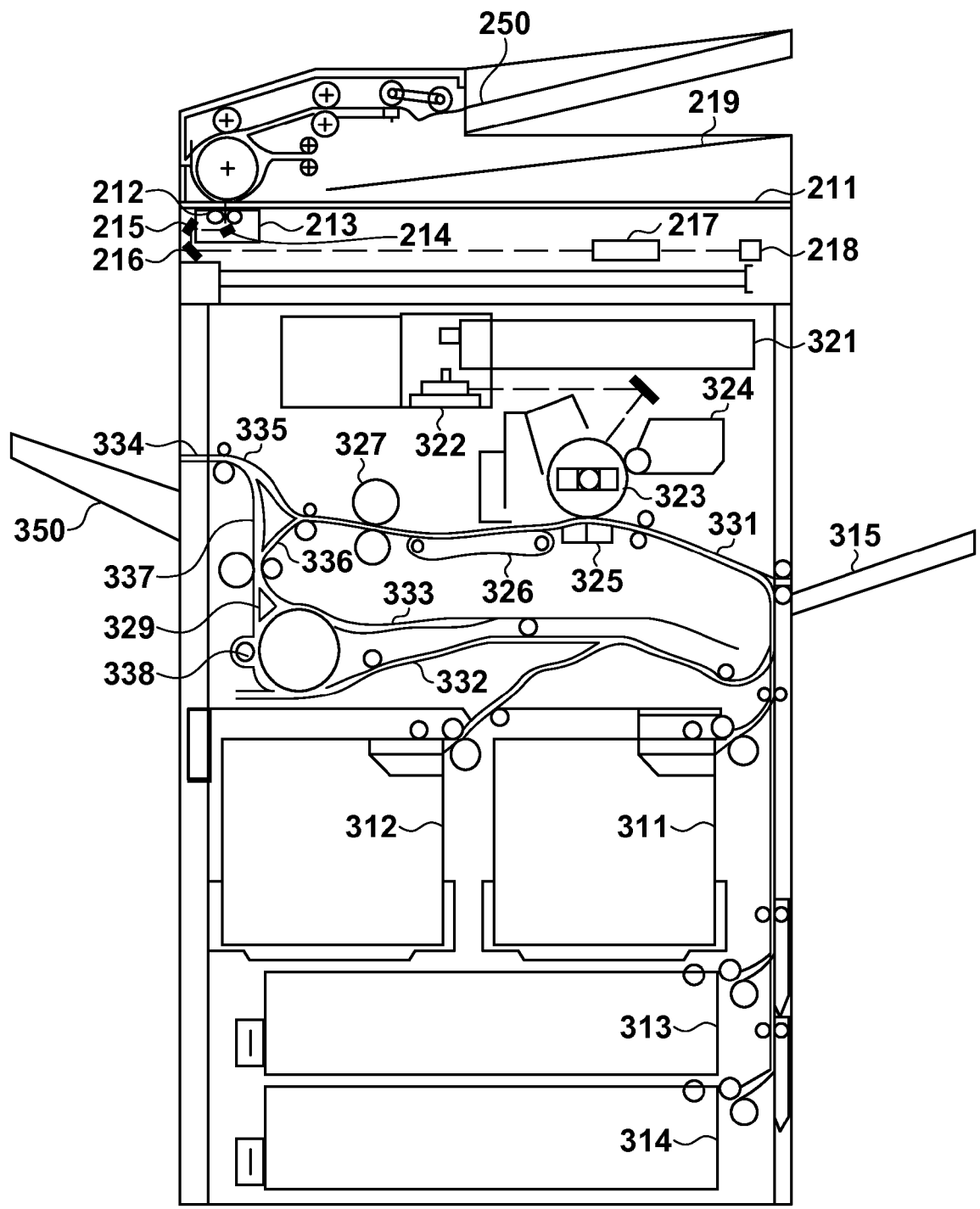
FIG. 2 is a sectional view showing the arrangements of a reader unit and printer unit according to the first embodiment.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

FIG. 1 is a block diagram showing the overall arrangement of an image input/output system to which an image forming apparatus (printing apparatus) according to the first embodiment of the present invention is applicable.

A reader unit (image input apparatus) 200 optically reads an original image, and converts the image into image data. The reader unit 200 includes a scanner unit 210 having a function of reading an original, and a document feeding unit (DF unit) 250 having a function of conveying original sheets. A printer unit (image output apparatus) 300 conveys recording paper (sheet), prints image data as a visible image on it, and discharges the recording paper from the apparatus. The printer unit 300 includes a paper feeding unit 310 having a plurality of types of recording paper cassettes, a marking unit 320 having a function of transferring and fixing image data onto recording paper, and a discharge unit 330 having a function of outputting printed recording paper from the apparatus.

A control unit 110 includes a CPU 120, image memory 130, flash memory 140, RAM 150, ROM 160, and operation unit 170. The control unit 110 is electrically connected to the reader unit 200 and printer unit 300. The CPU 120 of the control unit 110 provides a copy function by controlling the reader unit 200 to store image data of an original in the image memory 130, and controlling the printer unit 300 to print image data in the image memory 130 on recording paper (sheet). Note that the image memory 130 has a memory capacity only for several pages of image data, and its memory capacity is limited. Thus, image data which cannot be saved in the image memory 130 are moved to and stored in the flash memory 140. The flash memory 140 keeps holding its contents even after power-off, is readable/rewritable, and has a relatively large capacity. With these characteristics, the flash memory 140 is used to save image data in the image memory 130 that are to be left even after the main power supply is turned off, and to save various set values.

The RAM 150 is directly mapped in the main memory space of the CPU 120, and loses its contents after the main power supply is turned off. With this characteristic, the RAM 150 is used as the work area of the CPU 120. The ROM 160 is directly mapped in the main memory space of the CPU 120, similar to the RAM 150, and keeps holding its contents even after the main power supply is turned off. With this characteristic, the ROM 160 stores control programs for the CPU 120. The operation unit 170 includes a liquid crystal display unit, a touch panel input unit adhered onto the liquid crystal display unit, and a plurality of hard keys. A signal input via the touch panel or hard key is transmitted to the CPU 120, and the liquid crystal display unit displays functions, image data, and the like in the operation of the image forming apparatus.

FIG. 2 is a sectional view showing the arrangements of the reader unit 200 and printer unit 300 according to the embodiment.

First, the reader unit 200 will be explained. In the reader unit 200, the document feeding unit (feeder) 250 feeds original sheets one by one from the top onto a platen glass 211. After the end of an original reading operation, the document feeding unit 250 discharges the original sheet on the platen glass 211 to a discharge tray 219. When an original sheet is conveyed onto the platen glass 211, a lamp 212 is turned on, and an optical unit 213 starts moving to expose and scan the original sheet on the platen glass 211. Light reflected by the original sheet at this time is guided to a CCD image sensor (to be referred to as a CCD hereinafter) 218 by mirrors 214, 215, and 216, and a lens 217. The CCD 218 reads the scanned original image. Image data output from the CCD 218 undergoes predetermined processing and then is transferred to the control unit 110.

Next, the printer unit 300 will be explained. In the printer unit 300, a laser driver 321 drives a laser emitting unit 322 to emit a laser beam corresponding to the image data output from the control unit 110. The laser beam irradiates a photosensitive drum 323, forming a latent image corresponding to the laser beam on the photosensitive drum 323. A developing unit 324 applies a developer to the latent image. The printer unit 300 includes drawer-shaped cassettes 311 to 314 as paper feeding units. Further, the feeding units include a manual paper feeding tray 315.

The printer unit 300 feeds recording paper from one of the cassettes 311 to 314 and the manual paper feeding tray 315, and conveys it to a transfer unit 325 through a conveyance path 331. The transfer unit 325 transfers the developer attached to the photosensitive drum 323 onto the recording paper. A conveyance belt 326 conveys the developer-attached recording paper to a fixing unit 327, and the developer is fixed onto the recording paper by the heat and pressure of the fixing unit 327. The recording paper having passed through the fixing unit 327 is discharged through conveyance paths 335 and 334. Alternatively, when reversing the printed surface and then discharging the recording paper, the recording paper is guided to a conveyance path 338 through a conveyance path 336, and conveyed from there in an opposite direction. The recording paper is discharged to a discharge bin 350 through a conveyance path 337 and the conveyance path 334.

When double-sided printing is set, after passing through the fixing unit 327, the recording paper is guided from the conveyance path 336 to a conveyance path 333 by a flapper 329. The recording paper is conveyed in an opposite direction, and guided to a re-feed conveyance path 332 through the conveyance path 338 by the flapper 329. The recording paper guided to the re-feed conveyance path 332 is fed again to the transfer unit 325 through the conveyance path 331 at the above-described timing. Regardless of single-sided/double-sided printing, recording paper discharged through the conveyance path 334 is discharged onto the discharge bin 350 and stacked.

Figure 3:
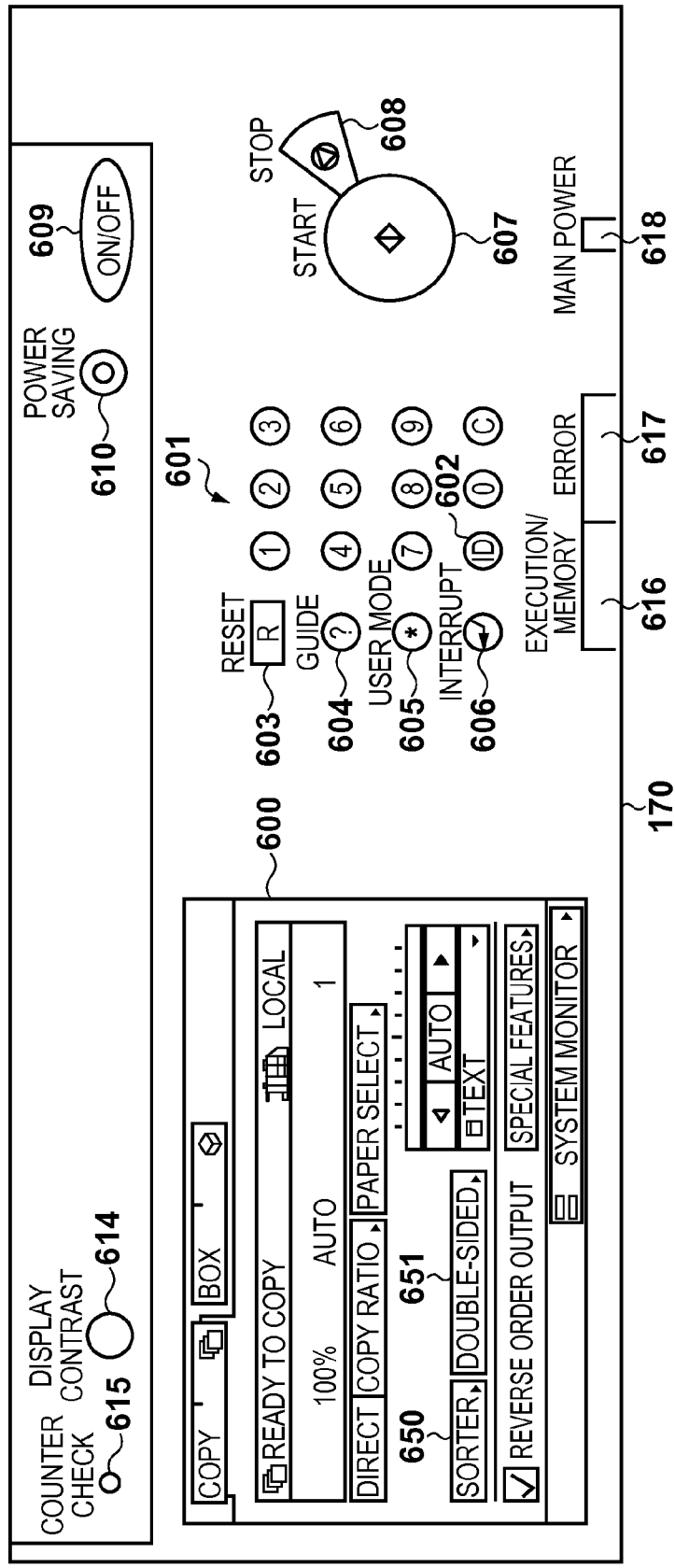
FIG. 3 is a plan view showing an operation unit according to the first embodiment.

The operation unit 170 will be explained with reference to FIG. 3. FIG. 3 is a plan view showing the operation unit 170 according to the embodiment.

In FIG. 3, an LCD touch panel 600 is used to make main mode settings and display a status. For example, switching to reverse order output according to the embodiment can be set with a reverse order output button 650. When the reverse order output button 650 is ON, it is checked with a tick, and when it is OFF, the tick disappears. A double-sided setting button 651 is used to switch between double-sided printing and single-sided printing. A ten-key pad 601 is used to enter a numerical value of 0 to 9. An ID key 602 is used to enter a department number and password code by the user when the image forming apparatus is managed by the department. A reset key 603 is used to reset a set mode. A guide key 604 is used to display an explanation screen for each mode. A user mode key 605 is used to enter a user mode screen. An interrupt key 606 is used to perform interrupt copying. A start key 607 is used to start a copy operation. A stop key 608 is used to stop a running copy job. When the user presses a soft power SW key 609, the backlight of the LCD touch panel 600 is turned off, and the image forming apparatus shifts to a low-power state. When the user presses a power saving key 610, the image forming state shifts to the power saving state, and when he presses the power saving key 610 again, returns from the power saving state. A contrast key 614 is used to adjust the contrast of the LCD touch panel 600. When the user presses a counter check key 615, a count screen appears on the LCD touch panel 600 and displays a total copy count used until now. An execution/memory LED 616 is turned on during execution of a job and during image accumulation in an image memory. An error LED 617 is turned on when an error has occurred in the apparatus, such as a jam or opening of the door. A power LED 618 is turned on when the main switch of the apparatus is ON and power is supplied.

FIGS. 4A to 4E are views for explaining normal order and reverse order output operations in double-sided printing of originals of the same size in the embodiment.

As shown in FIG. 4A, originals (original sheets) 4001, 4002, and 4003 of three pages of the same size exist in the document feeding unit (feeder) 250. Double-sided printing of these originals in normal order output will be explained. Normal order output and double-sided printing are set by pressing the start key 607 while the reverse order output button 650 in FIG. 3 is OFF and double-sided printing is set with the double-sided setting button 651.

FIG. 4B is a view showing a printing result in normal order output. Output sheets 4011 and 4012 are printed. The original 4001 of the first page is imposed and printed on the obverse surface of the first output sheet 4011, and the original 4002 of the second page is imposed and printed on its reverse surface. The original 4003 of the third page is imposed on the obverse surface of the second output sheet 4012, and a blank is imposed on its reverse surface. In double-sided printing when the number of originals of the same size corresponds to an odd page count, the reverse surface of the final output sheet becomes a blank.

FIG. 4C shows a state in which the printing results in FIG. 4B are discharged to the discharge bin 350 facedown (obverse surfaces facing down). The output sheets 4011 and 4012 are stacked on the discharge bin 350 in an order of "1", "2", and "3" pages and "blank" from the side of the discharge bin 350.

FIG. 4D shows double-sided printing in reverse order output. Reverse order output and double-sided printing are set by pressing the start key 607 while the reverse order output button 650 in FIG. 3 is ON and double-sided printing is set with the double-sided setting button 651. As a result, output sheets 4021 and 4022 are printed. The obverse surface of the first output sheet 4021 is a blank, and the original 4003 of the third page is imposed and printed on its reverse surface. The original 4002 of the second page is imposed and printed on the obverse surface of the second output sheet 4022, and the original 4001 of the first page is imposed and printed on its reverse surface. In this manner, in double-sided printing in the reverse order when the number of originals of the same size corresponds to an odd page count, the obverse surface of the first output sheet becomes a blank.

FIG. 4E shows a state in which the printing results in FIG. 4D are discharged to the discharge bin 350 facedown (obverse surfaces facing down). The output sheets 4021 and 4022 are stacked on the discharge bin 350 in an order of "blank" and "3", "2", and "1" pages from the side of the discharge bin 350.

FIGS. 5A to 5G are views for explaining normal order and reverse order output operations in double-sided printing of size-mixed originals.

Figure 5A:
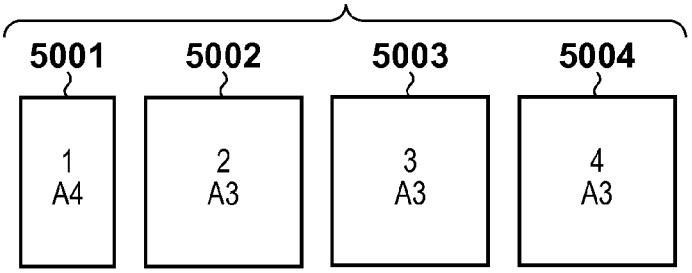
FIGS. 5A to 5G are views for explaining normal order and reverse order output operations in double-sided printing of size-mixed original sheets.

FIG. 5A is a view showing originals (original sheets) in the document feeding unit (feeder) 250. In this case, there are an A4-size original 5001 of the first page, and A3-size originals 5002 to 5004 of the second and third pages.

Figure 5B:
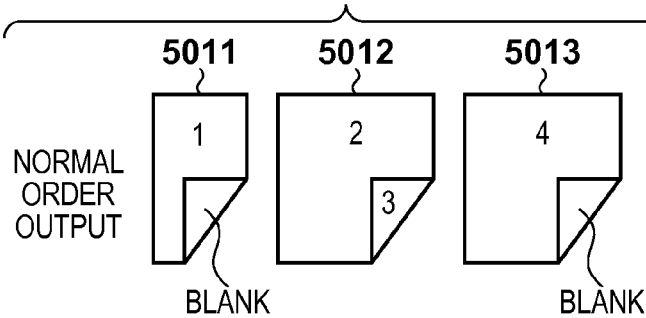

FIG. 5B is a view showing an example of double-sided printing of these originals in normal order output. A printing operation in normal order output and double-sided printing is implemented by pressing the start key 607 while the reverse order output button 650 in FIG. 3 is OFF and double-sided printing is set with the double-sided setting button 651. As a result, the original 5001 of the first page is printed on the obverse surface of a first output sheet 5011, and a blank is imposed on its reverse surface. This is because originals of different sizes cannot be imposed on the obverse and reverse surfaces. That is, the first A4-size original 5001 and second A3-size original 5002 cannot be imposed on the same sheet. Then, the original 5002 of the second page is imposed and printed on the obverse surface of a second output sheet 5012, and the original 5003 of the third page is imposed and printed on its reverse surface. The original 5004 of the fourth page is imposed and printed on the obverse surface of a third output sheet 5013, and a blank is imposed and printed on its reverse surface because there is no next original. In this manner, when copying size-mixed originals, which of a blank and printed surface serves as the reverse surface of the final output sheet cannot be determined unless the state of size-mixed originals is considered in addition to the page count of an original.

Figure 5C:
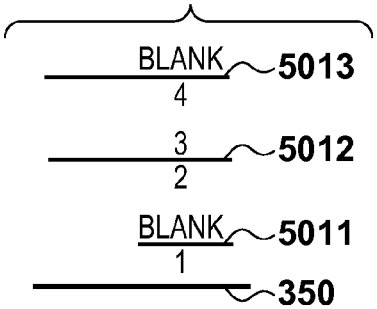

FIG. 5C shows a state in which the printing results in FIG. 5B are discharged to the discharge bin 350 facedown (obverse surfaces facing down). The output sheets are stacked in an order of "1" page, "blank", "2", "3", and "4" pages, and "blank" from the side of the discharge bin 350.

Figure 5D:
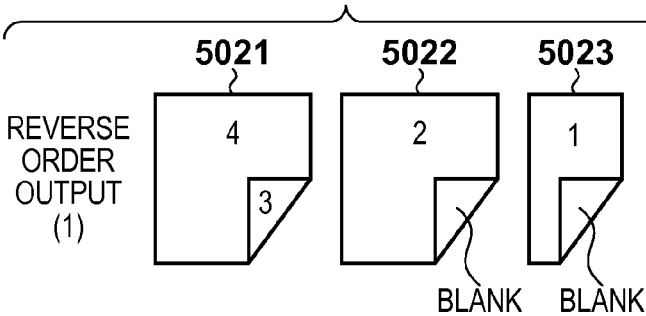

FIG. 5D is a view for explaining reverse order output (1). A case in which size-mixed originals undergo double-sided printing in reverse order output will be explained.

In double-sided printing in the reverse order when the page count of an original is an even number, it is determined to print on the obverse surface of the first output sheet. Thus, the original 5004 of the fourth page is imposed and printed on the obverse surface of a first output sheet 5021, and the original 5003 of the third page is imposed and printed on its reverse surface. The original 5002 of the second page is imposed and printed on the obverse surface of a second output sheet 5022, and a blank is imposed and printed on its reverse surface (because the size differs between the first and second pages). Further, the original 5001 of the first page is imposed and printed on the obverse surface of a third output sheet 5023, and a blank is imposed and printed on its reverse surface.

Figure 5E:
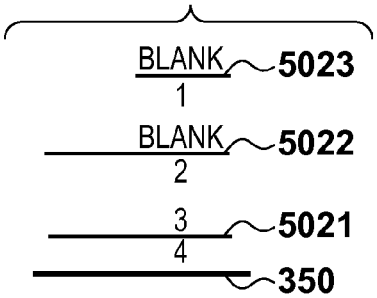

FIG. 5E shows a state in which the printing results in FIG. 5D are discharged to the discharge bin 350 facedown (obverse surfaces facing down). The output sheets 5021, 5022, and 5023 are stacked sequentially on the discharge bin 350 in an order of "4", "3", and "2" pages, "blank", "1" page, and "blank" from the side of the discharge bin 350. This imposition differs from that in normal order output, and no expected reverse order printing is achieved.

Figure 5F:
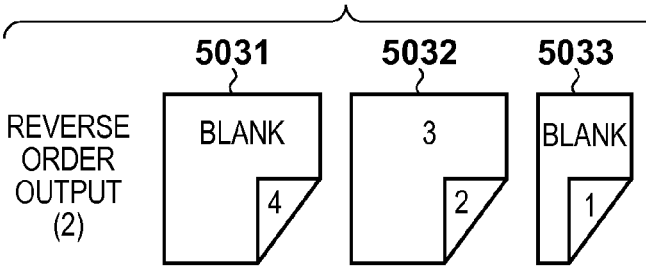

FIG. 5F is a view for explaining reverse order output (2). In this case, a blank is imposed and printed on the obverse surface of a first output sheet 5031, and the original 5004 of the fourth page is imposed and printed on its reverse surface. The original 5003 of the third page is imposed and printed on the obverse surface of a second output sheet 5032, and the original 5002 of the second page is imposed and printed on its reverse surface. In addition, a blank is imposed and printed on the obverse surface of a third output sheet 5033, and the original 5001 of the first page is imposed and printed on its reverse surface.

Figure 5G:
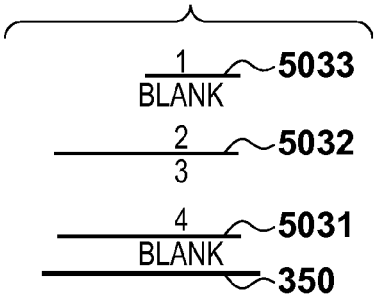

FIG. 5G shows a state in which the printing results in FIG. 5F are discharged to the discharge bin 350 facedown (obverse surfaces facing down). The output sheets 5031, 5032, and 5033 are stacked sequentially on the discharge bin 350 in an order of "blank", "4", "3", and "2" pages, "blank", and "1" page from the side of the discharge bin 350. This output result is a result expected in double-sided printing of the originals 5001, 5002, 5003, and 5004 in FIG. 5A in the reverse order.

Figure 6:
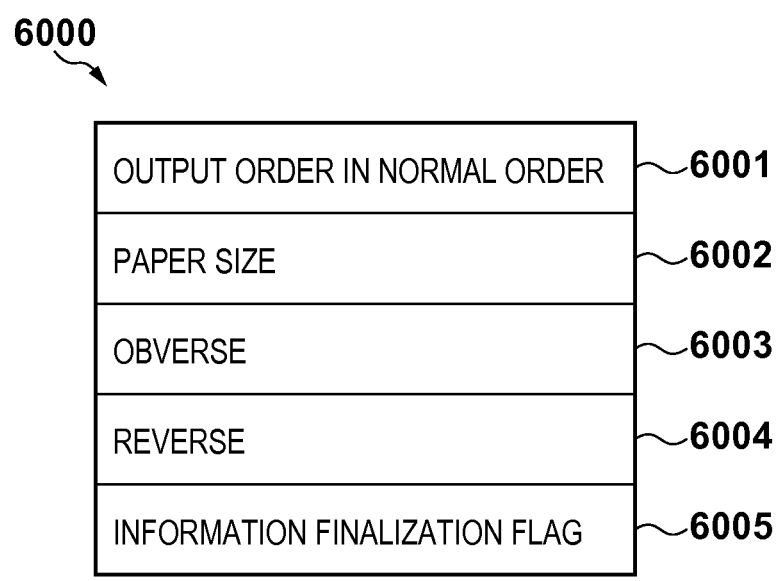
FIG. 6 is a view for explaining imposition information in the image forming apparatus according to the first embodiment.

FIG. 6 is a view for explaining imposition information in the image forming apparatus according to the embodiment.

The imposition information includes an output order 6001 in normal order output, a paper size 6002, an obverse 6003 which specifies an original corresponding to the obverse surface, a reverse 6004 which specifies an original corresponding to the reverse surface, and an imposition information finalization flag 6005. The CPU 120 generates imposition information, and saves it in the RAM 150 serving as the work area of the control unit 110, or deletes it. The imposition information is also saved in the flash memory 140 together with an original image.

Figure 7:
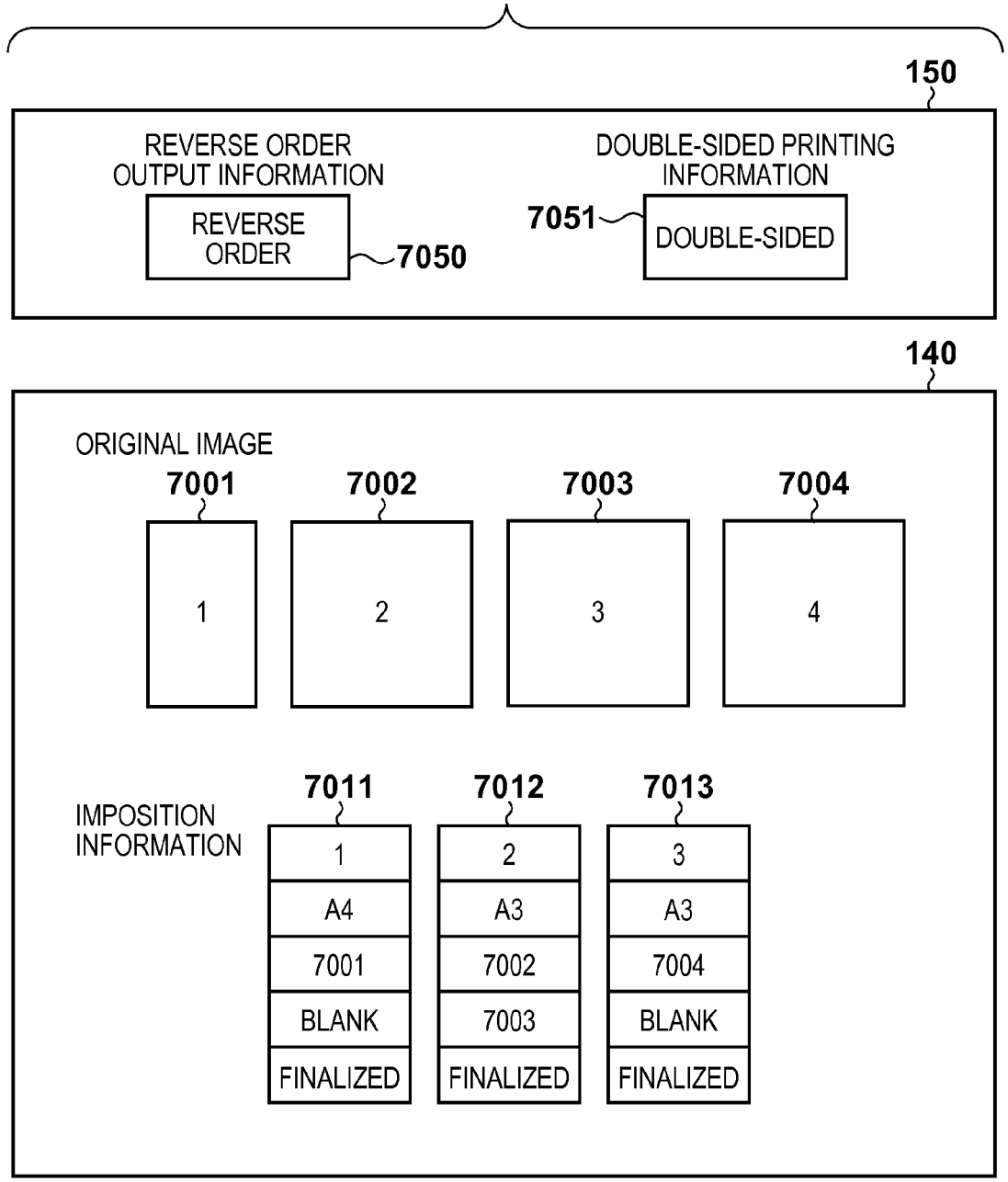
FIG. 7 is a view for explaining an example of information in a RAM and an example of imposition information in a flash memory according to the first embodiment.

FIG. 7 is a view for explaining an example of information saved in the RAM 150 and an example of imposition information saved in the flash memory 140 according to the embodiment.

The RAM 150 stores reverse order output information 7050 which holds information representing reverse order output or normal order output, and double-sided printing information 7051 which holds information representing single-sided printing or double-sided printing. The reverse order output information 7050 corresponds to ON/OFF of the reverse order output button 650 (FIG. 3), and the double-sided printing information 7051 corresponds to ON/OFF of the double-sided setting button 651 (FIG. 3).

Similar to FIG. 5A, original information in the flash memory 140 corresponds to an A4-size original image 7001 of the first page, and A3-size original images 7002 to 7004 of the second to fourth pages. As imposition information, pieces of imposition information 7011, 7012, and 7013 exist.

In the imposition information 7011, the output order of normal order output is "1", the paper size is "A4", an original image corresponding to the obverse surface is the original image 7001 of the first page, an original image corresponding to the reverse surface is "blank", and the information finalization flag is "finalized". In the imposition information 7012, the output order of normal order output is "2", the paper size is "A3", an original image corresponding to the obverse surface is the original image 7002 of the second page, an original image corresponding to the reverse surface is the original image 7003 of the third page, and the information finalization flag is "finalized". In the imposition information 7013, the output order of normal order output is "3", the paper size is "A3", an original image corresponding to the obverse surface is the original image 7004 of the fourth page, an original image corresponding to the reverse surface is "blank", and the information finalization flag is "finalized".

Figure 8:
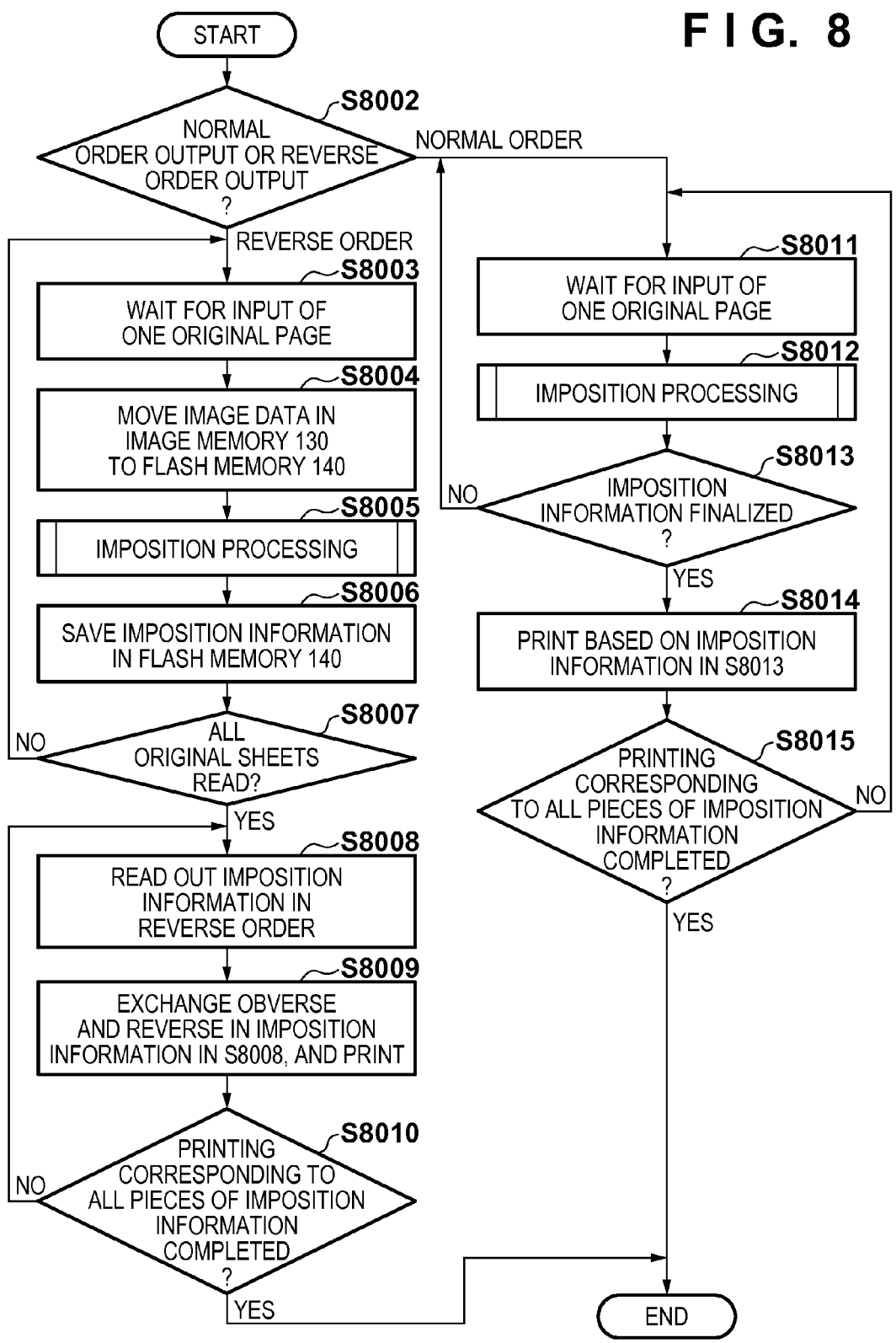
FIG. 8 is a flowchart for explaining a printing control method by the control unit of the image forming apparatus according to the first embodiment.

FIG. 8 is a flowchart for explaining a printing control method by the control unit 110 of the image forming apparatus according to the embodiment. This flowchart is implemented by executing a program in the ROM 160 by the CPU 120 of the control unit 110 using the RAM 150 as a work area.

In step S8002, the control unit 110 determines, based on the reverse order output information 7050 in the RAM 150 that is exemplified in FIG. 7, whether normal order output or reverse order output is set. If the control unit 110 determines that reverse order output is set, the process advances to step S8003; if it determines that normal order output is set, to step S8011. In step S8003 (reverse order), the control unit 110 waits for input of one original page from the reader unit 200. When the user sets an original sheets bundle on the document feeding unit (feeder) 250 and presses the start key 607, the control unit 110 reads the original sheets on the document feeding unit (feeder) 250 sequentially page by page. Image data of each original is then saved in the image memory 130. After that, the process advances to step S8004, and the control unit 110 moves the image data in the image memory 130 to the flash memory 140. This is because the memory capacity of the image memory 130 is limited, as described above. If the image memory 130 has a sufficient capacity, this processing can be omitted.

The process advances to step S8005, and the control unit 110 performs imposition processing based on imposition information already present in the flash memory 140 and the size of the image data. Details of the imposition processing will be described later with reference to FIG. 9. The process advances to step S8006, and the control unit 110 stores the imposition information created in step S8005 in the flash memory 140. The process advances to step S8007, and the control unit 110 determines whether all original sheets have been read from the reader unit 200. If a plurality of original sheets of the original sheets bundle still exist on the document feeding unit (feeder) 250 and an intermediate original sheet is being read, the process advances to step S8003 to read the next original page. After the end of reading all original sheets, the process advances to step S8008.

In step S8008, the control unit 110 reads out the pieces of imposition information saved in the flash memory 140. For example, as for the pieces of imposition information 7011, 7012, and 7013 in FIG. 7, "1", "2", and "3" are assigned in order by the "output order in normal order" in the pieces of imposition information 7011, 7012, and 7013. Therefore, to read out the pieces of imposition information in the reverse order, the imposition information 7013 is read out first. Then, the process advances to step S8009, and the control unit 110 prints based on the imposition information read out in step S8008. The control unit 110 copies, from the flash memory 140 to the image memory 130, image data of originals corresponding to the obverse and reverse in the imposition information read out in step S8008, and issues a print instruction to the printer unit 300. At this time, because of reverse order printing, the control unit 110 exchanges the obverse and reverse in the imposition information with each other, and then issues a print instruction. In step S8010, the control unit 110 determines whether printing corresponding to all pieces of imposition information has been completed. If printing corresponding to all pieces of imposition information has been completed, the process ends. If printing corresponding to all pieces of imposition information has not been completed, the process returns to step S8008 to perform printing control corresponding to the next imposition information.

If the control unit 110 determines in step S8002 that normal order output is set, the process advances to step S8011, and the control unit 110 waits for input of one original page from the reader unit 200. When the user sets an original sheets bundle on the document feeding unit (feeder) 250 and presses the start key 607, the control unit 110 reads the original sheets on the document feeding unit (feeder) 250 sequentially page by page. Image data of each original is then saved in the image memory 130. In step S8012, the control unit 110 performs imposition processing based on imposition information already present in the flash memory 140 and the size of the image data. This processing is the same as that in step S8005 described above, and details of this processing will be described later with reference to FIG. 9.

The process advances to step S8013, and the control unit 110 determines whether imposition information in the flash memory 140 has been finalized. If the imposition information has been finalized, the process advances to step S8014; if it has not been finalized, to step S8011 to wait for input of the next original. In step S8014, the control unit 110 prints based on the imposition information finalized in step S8013. Thereafter, the process advances to step S8015, and the control unit 110 determines whether printing corresponding to all pieces of imposition information has been completed. If printing corresponding to all pieces of imposition information has been completed, the process ends. If printing corresponding to all pieces of imposition information has not been completed, the process returns to step S8011 to perform print processing corresponding to the next imposition information. After the end of printing control for all pieces of imposition information, the control unit 110 ends this processing.

Figure 9:
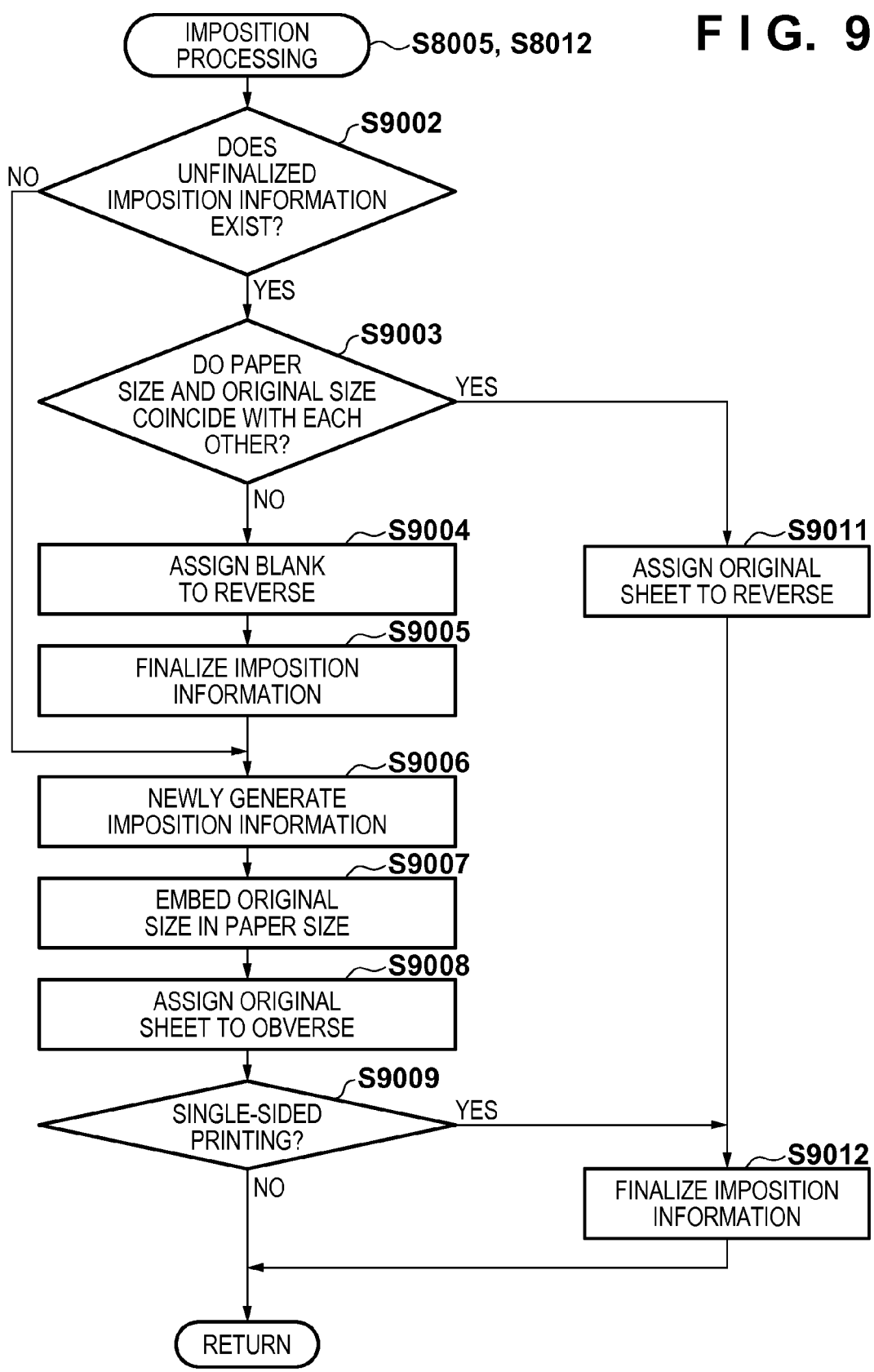
FIG. 9 is a flowchart for explaining imposition processing in step S8005 or S8012 of FIG. 8.

FIG. 9 is a flowchart for explaining imposition processing in step S8005 or S8012 of FIG. 8. Similar to FIG. 8, this flowchart is implemented by executing a program in the ROM 160 by the CPU 120 of the control unit 110 using the RAM 150 as a work area.

In step S9002, the control unit 110 determines whether unfinalized imposition information exists in the flash memory 140. If unfinalized imposition information exists, the process advances to step S9003; if no unfinalized imposition information exists, to step S9006. Unfinalized imposition information means imposition information in which only the obverse surface has been finalized in imposition information for double-sided printing and an original to be assigned to the reverse surface has not been finalized.

The process advances to step S9003, and the control unit 110 determines whether the paper size in the unfinalized imposition information obtained in step S9002 coincides with the original size of one input page. The original size is the size of an original of one page input in step S8003 or S8011 of FIG. 8. If the control unit 110 determines that the paper size does not coincide with the original size, the process advances to step S9004; if it determines that the paper size coincides with the original size, to step S9011. In step S9004, the control unit 110 assigns a blank to the reverse surface in the unfinalized imposition information obtained in step S9002. This is because originals of different sizes cannot be assigned to the obverse and reverse surfaces of one sheet, as described with reference to FIGS. 5A to 5G. The process then advances to step S9005. In step S9005, the control unit 110 sets "finalized" at the information finalization flag in the imposition information in which originals have been assigned to the obverse and reverse surfaces, and the process advances to step S9006.

The control unit 110 newly creates imposition information in step S9006, and embeds pieces of information in the newly created imposition information in steps S9007 and S9008. More specifically, in step S9007, the control unit 110 embeds the paper size in the imposition information created in step S9006 with the paper size of the original (original of one page input in step S8003 or S8011 of FIG. 8). The process advances to step S9008, and the control unit 110 assigns the original (original of one page input in step S8003 or S8011 of FIG. 8) to the obverse surface in the imposition information created in step S9006. Thereafter, the process advances to step S9009, and the control unit 110 determines, based on the double-sided printing information 7051 in the RAM 150, which of single-sided printing and double-sided printing is set. If double-sided printing is set, imposition information cannot be finalized, and the imposition processing ends with the imposition information remaining unfinalized. This is because the reverse surface in the imposition information has not been finalized owing to double-sided printing. If single-sided printing is set, the process advances to step S9012 to "finalize" the imposition information, and the imposition processing ends.

If the control unit 110 determines in step S9003 that the sizes coincide with each other, the process advances to step S9011, and the control unit 110 assigns the original of one page input in step S8003 or S8011 of FIG. 8 to the reverse surface in the unfinalized imposition information. The process advances to step S9012, and the control unit 110 sets "finalized" at the information finalization flag because both the obverse and reverse surfaces in the imposition information have been finalized. After that, a series of imposition processes end.

As described above, according to the first embodiment, even in double-sided printing of size-mixed originals in reverse order output, as shown in FIG. 5A, the memory holds the pieces of imposition information 7011, 7012, and 7013 which impose original sheets on recording sheets in the normal order. After the end of reading all original sheets, the pieces of imposition information held in the memory are read out in the reverse order. The first embodiment can therefore implement reverse order output opposite to normal order output.

Second Embodiment

The second embodiment according to the present invention will be described. A conventional image forming apparatus has a document print function of displaying a list of image data saved in the flash memory 140, prompting the user to select image data he wants from the list, and printing the image data. The second embodiment will explain printing control when a plurality of documents are selected from documents saved in a flash memory 140, and output in the reverse order. Note that the hardware arrangement of an image forming apparatus according to the second embodiment is the same as that of the image forming apparatus according to the first embodiment, and a description thereof will not be repeated.

Figure 10:
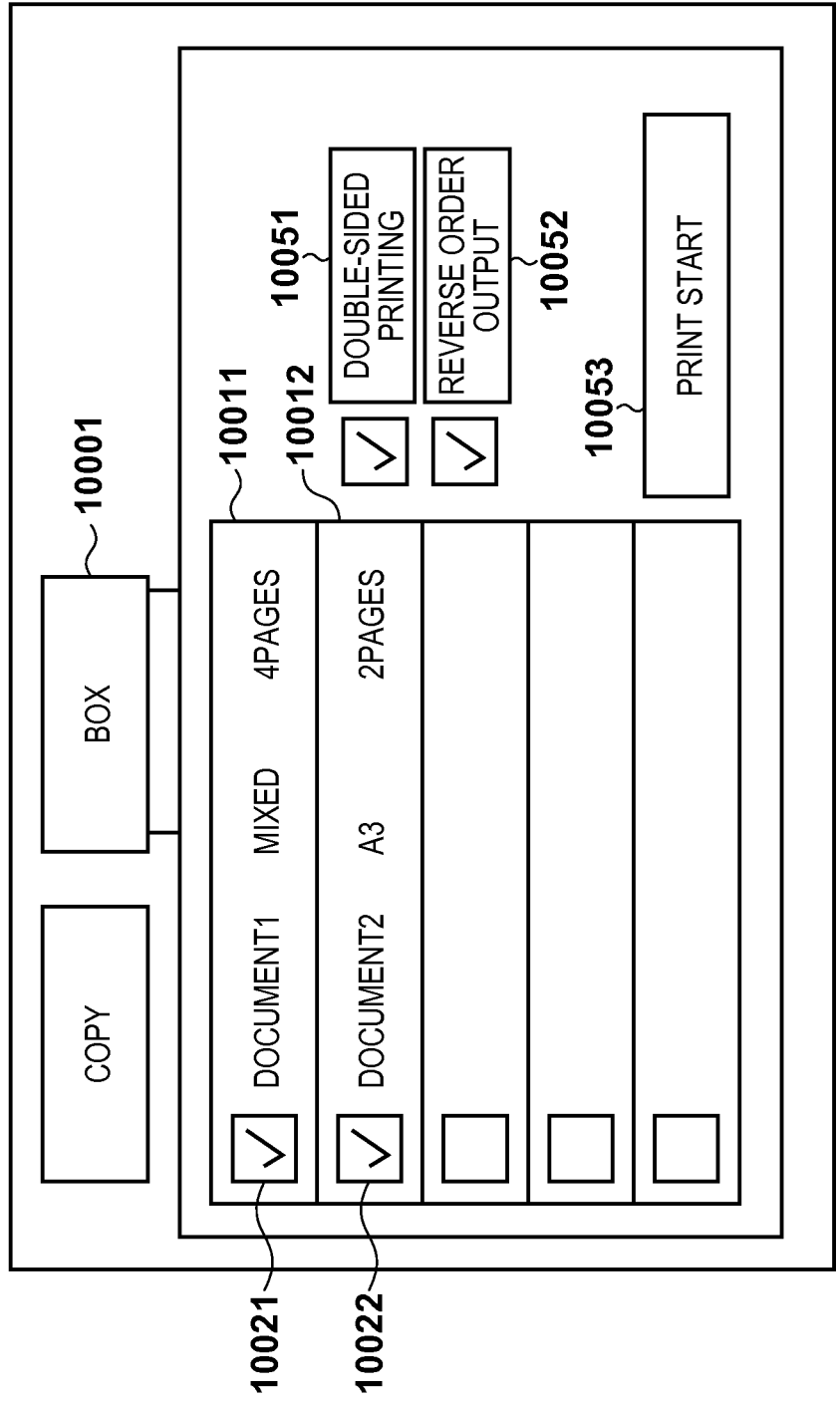
FIG. 10 is a view exemplifying a display on an LCD touch panel in document printing according to the second embodiment.

FIG. 10 is a view exemplifying a display on an LCD touch panel 600 in document printing according to the second embodiment.

When the user presses a box button 10001, a print function screen for documents stored in a box appears. The document print function screen displays a list of documents stored in the flash memory 140. In the second embodiment, there are two, document 1 (10011) and document 2 (10012). When the user selects the document 1 (10011), a box 10021 is checked (ticked) to represent that the document 1 has been selected. Similarly, when the user selects the document 2 (10012), a box 10022 is checked (ticked) to represent that the document 2 has been selected. In the example of FIG. 10, both the documents 1 and 2 are selected, so both the boxes 10021 and 10022 are checked.

To print the selected documents in this state, the user presses a print start button 10053. To perform double-sided printing for the selected documents, the user selects a double-sided printing button 10051 (checks it with a tick), and then presses the print start button 10053. If the user selects a reverse order output setting button 10052 (checks it with a tick), and then presses the print start button 10053, the selected documents are printed by reverse order output. In FIG. 10, two documents are selected, and it is set to print them by double-sided printing in the reverse order.

FIGS. 11A to 11E are views for explaining a document image and imposition information in document printing according to the second embodiment.

Figure 11A:
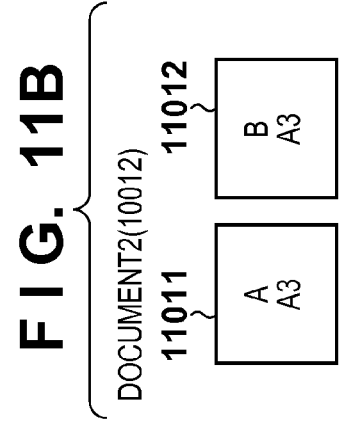
FIGS. 11A to 11E are views for explaining a document image and imposition information in document printing according to the second embodiment.
Figure 11B:
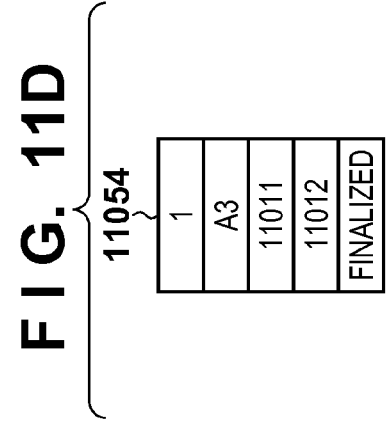

FIG. 11A is a view for explaining the originals (original sheets) of the first document 1 (10011). The first document 1 (10011) is formed from an A4-size original 11001 of the first page, and A3-size originals 11002, 11003, and 11004 of the second, third, and fourth pages. FIG. 11B is a view for explaining the originals (original sheets) of the second document 2 (10012). The second document 2 (10012) is formed from an A3-size original 11011 of the first page and an A3-size original 11012 of the second page.

Figure 11C:
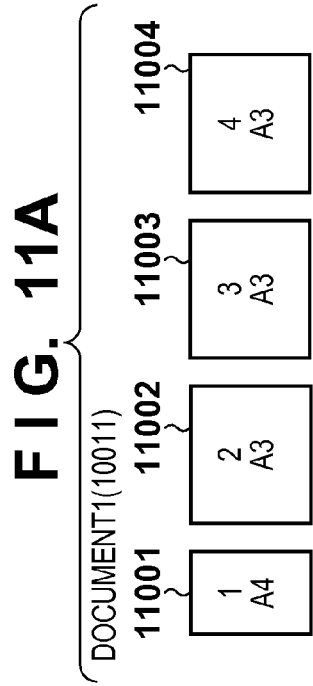

FIG. 11C is a view for explaining imposition information corresponding to the document 1 (10011). There are pieces of imposition information 11051, 11052, and 11053. Similar to FIG. 7, in the imposition information 11051, the output order of normal order output is "1", the paper size is "A4", an original corresponding to the obverse surface is the "original 11001", an original corresponding to the reverse surface is "blank", and the information finalization flag is "finalized". In the imposition information 11052, the output order of normal order output is "2", the paper size is "A3", an original corresponding to the obverse surface is the "original 11002", an original corresponding to the reverse surface is the "original 11003", and the information finalization flag is "finalized". In the imposition information 11053, the output order of normal order output is "3", the paper size is "A3", an original corresponding to the obverse surface is the "original 11004", an original corresponding to the reverse surface is "blank", and the information finalization flag is "finalized".

Figure 11D:

FIG. 11D shows imposition information 11054 serving as imposition information corresponding to the document 2 (10012). In the imposition information 11054, the output order of normal order output is "1", the paper size is "A3", an original corresponding to the obverse surface is the "original 11011", an original corresponding to the reverse surface is the "original 11012", and the information finalization flag is "finalized".

Figure 11E:
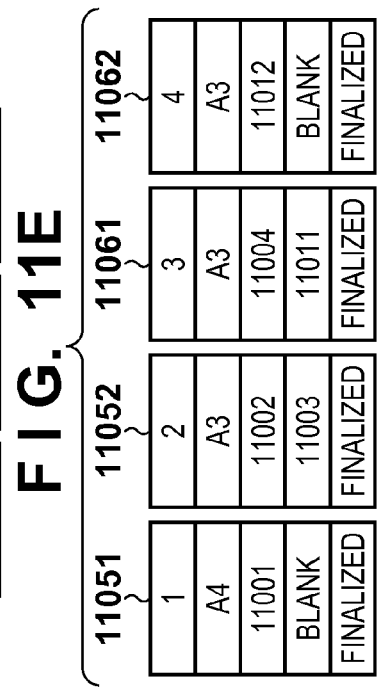

In FIG. 11C, the reverse surface in the final imposition information 11053 of the document 1 (10011) is a blank. Therefore, when selecting and printing the document 1 (10011) and document 2 (10012), it is necessary to assign the first original 11011 of the document 2 to "blank" on the reverse surface in the information 11053, and perform double-sided printing. In this case, when selecting and printing the document 1 (10011) and document 2 (10012), the imposition information 11053 and imposition information 11054 are deleted. Then, imposition information 11061 and imposition information 11062 are newly generated, as shown in FIG. 11E.

In the imposition information 11061, the output order of normal order output is "3", the paper size is "A3", an original corresponding to the obverse surface is the "original 11004", an original corresponding to the reverse surface is the "original 11011", and the information finalization flag is "finalized". In the imposition information 11062, the output order of normal order output is "4", the paper size is "A3", an original corresponding to the obverse surface is the "original 11012", an original corresponding to the reverse surface is "blank", and the information finalization flag is "finalized".

When selecting and printing the document 1 (10011) and document 2 (10012), imposition processing is generally executed sequentially from the first original 11001 of the document 1. However, even if pieces of imposition information are regenerated from the start of the document 1, they remain unchanged except for the final imposition information. In the example of FIG. 11C, there are three pieces of imposition information. If there are many pieces of imposition information of the document 1 (10011), the generation cost of regenerating pieces of imposition information rises. To prevent this, when selecting and printing a plurality of documents, it is desirable to regenerate the final imposition information (imposition information 11053 in FIG. 11C) of a preceding document (document 1) whose imposition information may change.

Figure 12:
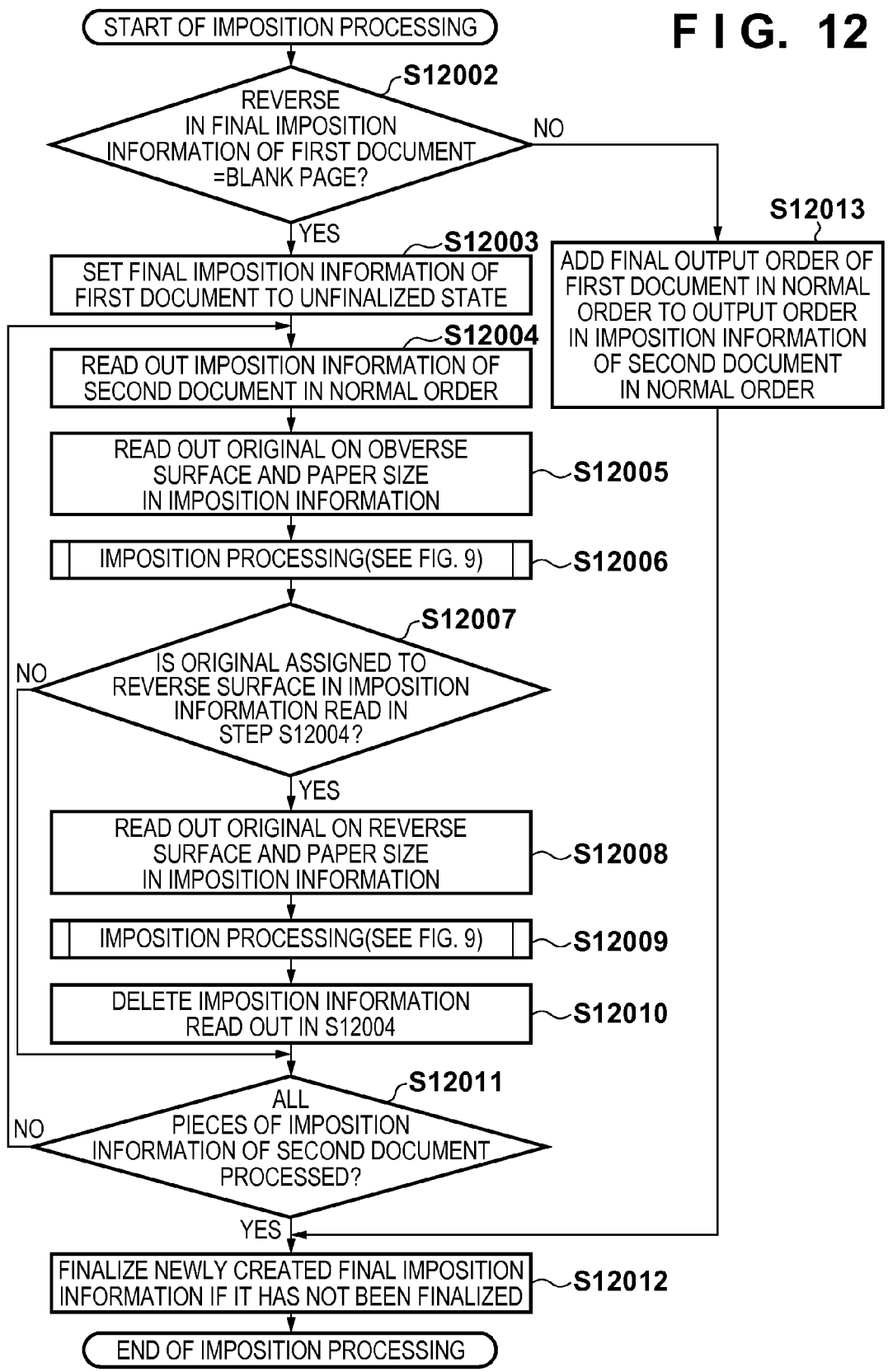
FIG. 12 is a flowchart for explaining printing control by the control unit of an image forming apparatus according to the second embodiment.

FIG. 12 is a flowchart for explaining printing control by a control unit 110 of the image forming apparatus according to the second embodiment. This flowchart is implemented by executing a program in a ROM 160 by a CPU 120 of the control unit 110 using a RAM 150 as a work area.

In step S12002, the control unit 110 determines whether the reverse in the final imposition information 11053 of the document 1 (10011) in the flash memory 140 is a blank. If the reverse in the final imposition information 11053 is a blank, the process advances to step S12003; if the reverse in the final imposition information 11053 is not a blank and an original is assigned, to step S12013. In step S12003, the control unit 110 sets "unfinalized" at the information finalization flag in the final imposition information 11053 of the document 1 (10011). The process advances to step S12004, and the control unit 110 reads out imposition information of the document 2 (10012) in the normal order. The process advances to step S12005, and the control unit 110 reads an original on the obverse surface and a paper size in the imposition information of the document 2 that has been read out in step S12004. For example, in FIG. 11D, the "original 11011" serving as an original on the obverse surface and the paper size "A3" in the imposition information 11054 are extracted.

Then, the process advances to step S12006, and the control unit 110 performs imposition processing shown in the flowchart of FIG. 9 based on the original and paper size read in step S12005. Details of the imposition processing are the same as those in FIG. 9, and a description thereof will not be repeated. For example, in FIG. 11E, the "original 11011" is assigned to the reverse surface in the imposition information 11061 (which is originally the imposition information 11053) in step S12006.

The process advances to step S12007, and the control unit 110 determines whether an original has been assigned to the reverse surface in the imposition information of the document 2 that has been read in step S12004. If an original has been assigned, the process advances to step S12008; if no original has been assigned, to step S12011. In step S12008, the control unit 110 reads out an original on the reverse surface and a paper size in the imposition information that has been read in step S12004. For example, in FIG. 11D, the "original 11012" serving as an original on the reverse surface and the paper size "A3" in the imposition information 11054 are extracted. Thereafter, the process advances to step S12009, the control unit 110 performs imposition processing in FIG. 9 based on the original and paper size read in step S12008. Details of the imposition processing are the same as those in FIG. 9, and a description thereof will not be repeated. For example, as shown in FIG. 11E, the "original 11012" is assigned to the obverse surface in the imposition information 11062 in step S12009.

In step S12010, the imposition information of the document 2 that has been read in step S12004 becomes unnecessary, so the control unit 110 deletes the imposition information. For example, the imposition information 11054 shown in FIG. 11D becomes unnecessary and is deleted. The process advances to step S12011, and the control unit 110 determines whether all pieces of imposition information of the document 2 (10012) have been processed. If all pieces of imposition information of the document 2 (10012) have been processed, the process advances to step S12012. If imposition information to be processed still remains, the process returns to step S12004 to process the next imposition information. For example, in FIG. 11D, the imposition information 11054 is the final imposition information of the document 2 (10012), so the process advances to step S12012. In step S12012, if the newly created final imposition information has not been finalized, the control unit 110 "finalizes" it. For example, in FIG. 11E, the control unit 110 sets "finalized" at the finalization flag in the imposition information 11062 generated in step S12009.

If the reverse in the final imposition information 11053 of the document 1 (10011) is not a blank in step S12002, the process advances to step S12013, and the control unit 110 determines that the final imposition information of the first document does not change. Thus, the control unit 110 adds the final output order of the first document in the normal order to the output order in imposition information of the second document in the normal order. Then, the imposition processing for reverse order output when a plurality of documents are selected ends. After that, the control unit 110 shifts to step S8008 in the flowchart of FIG. 8 to execute printing control in reverse order output.

As described above, according to the second embodiment, only imposition information necessary to implement the same imposition and layout as those in normal order output is generated. Even if the user selects a plurality of documents, it suffices to update only minimum imposition information. This can reduce the burden on the control unit 110.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus capable of performing duplex printing, comprising:
    an assigning unit configured to assign original images of a plurality of pages to front and back surfaces of each of a plurality of sheets, wherein assignment of the original images is performed, in both of a case of normal order output being instructed and a case of reverse order output being instructed, in turn from a first page of the plurality of pages, and a blank page is assigned when a number of consecutive pages of a same size is an odd number; and
    a printing control unit configured to, when the normal order output is instructed, control to print the original images from a sheet to which the assigning unit assigns an original image of the first page out of the plurality of pages, and when the reverse order output is instructed, control to print the original images from a sheet to which the assigning unit assigns an original image of a final page out of the plurality of pages,
    wherein printing of the original images is performed based on a result of the assignment in which the original images are assigned in turn from the first page of the plurality of pages, in both of the case of the normal order output being instructed and the case of the reverse order output being instructed.

2. The apparatus according to claim 1, wherein the assigning unit is configured not to assign, of the original images of the plurality of pages, images of different sizes to a single sheet.

3. The apparatus according to claim 1, further comprising a storage unit configured to store imposition information representing a surface to which the assigning unit assigns each of the original images,
    wherein when the reverse order output is instructed, the printing control unit controls to print, in accordance with the imposition information stored in the storage unit, the original images from a sheet to which the assigning unit assigns the original image of the final page out of the plurality of pages.

4. A control method for controlling a printing apparatus capable of performing duplex printing, comprising:
    assigning original images of a plurality of pages to front and back surfaces of each of a plurality of sheets, wherein assignment of the original images is performed, in both of a case of normal order output being instructed and a case of reverse order output being instructed, in turn from a first page of the plurality of pages, and a blank page is assigned when a number of consecutive pages of a same size is an odd number;

when the normal order output is instructed, controlling to print the original images from a sheet to which an original image of the first page out of the plurality of pages is assigned; and when the reverse order output is instructed, controlling to print the original images from a sheet to which an original image of a final page out of the plurality of pages is assigned, wherein printing of the original images is performed based on a result of the assignment in which the original images are assigned in turn from the first page of the plurality of pages, in both of the case of the normal order output being instructed and the case of the reverse order output being instructed.

5. A non-transitory computer-readable storage medium storing a program for causing a computer to execute a control method for controlling a printing apparatus capable of performing duplex printing, the program including:

assigning original images of a plurality of pages to front and back surfaces of each of a plurality of sheets, wherein assignment of the original images is performed, in both of a case of normal order output being instructed and a case of reverse order output being instructed, in turn from a first page of the plurality of pages, and a blank page is assigned when a number of consecutive pages of a same size is an odd number;

when the normal order output is instructed, controlling to print the original images from a sheet to which an original image of the first page out of the plurality of pages is assigned; and when the reverse order output is instructed, controlling to print the original images from a sheet to which an original image of a final page out of the plurality of pages is assigned, wherein printing of the original images is performed based on a result of the assignment in which the original images are assigned in turn from the first page of the plurality of pages, in both of the case of the normal order output being instructed and the case of the reverse order output being instructed.

* * * * *